United States Patent [19]
Santos et al.

[11] Patent Number: 5,485,343
[45] Date of Patent: Jan. 16, 1996

[54] DIGITAL CIRCUIT INTERRUPTER WITH BATTERY BACK-UP FACILITY

[75] Inventors: Esteban Santos, Windsor; Hanns P. Sailer, Plainville; Paul H. Singer, West Hartford; Indrajit Purkayastha, Weatogue, all of Conn.

[73] Assignee: General Electric Company, New York, N.Y.

[21] Appl. No.: 200,048

[22] Filed: Feb. 22, 1994

[51] Int. Cl.⁶ .................................................. H02H 3/08
[52] U.S. Cl. .................. 361/115; 361/94; 361/97
[58] Field of Search .................. 361/93–98, 18, 361/115

[56] References Cited

U.S. PATENT DOCUMENTS

| | | | |
|---|---|---|---|
| 4,428,022 | 1/1984 | Engel et al. ........................... | 361/96 |
| 4,672,501 | 6/1987 | Bilac et al. ........................... | 361/96 |
| 4,751,606 | 6/1988 | Matsko et al. ....................... | 361/93 |
| 4,870,531 | 9/1989 | Danek .................................. | 361/93 |
| 5,089,928 | 2/1992 | Durivage et al. ................... | 361/94 |
| 5,220,479 | 6/1993 | Fraisse ................................. | 361/97 |

*Primary Examiner*—A. D. Pellinen
*Assistant Examiner*—S. Jackson
*Attorney, Agent, or Firm*—Richard A. Menelly

[57] ABSTRACT

A digital circuit interrupter utilizing current transformers for operating power is provided with a re-chargeable battery to power-up the trip unit as well as to power the display after an overcurrent trip occurrence to enable an operator to determine both the magnitude as well as the cause of the overcurrent condition.

16 Claims, 3 Drawing Sheets

DIGITAL CIRCUIT INTERRUPTER WITH BATTERY BACK-UP FACILITY

BACKGROUND OF THE INVENTION

U.S. Pat. No. 4,672,501 entitled "Circuit Breaker and Protective Relay Unit" describes the use of a digital circuit interrupter employing a microprocessor in combination with ROM and RAM memory elements to provide both relaying as well as protection function to an electrical distribution system. The current transformers used for monitoring the circuit current are also connected to provide operating power to the microprocessor and related circuit components. In the event that the circuit becomes interrupted upon the occurrence of a fault condition, it is difficult to determine the magnitude as well as the cause of the overcurrent condition that initiated the fault since the digital circuit interrupter loses operational power.

U.S. Pat. Nos. 4,428,022 and 4,751,606 each describe means for automatically converting from system power to an auxiliary power source as soon as the electrical distribution circuit is interrupted.

U.S. Pat. Nos. 5,089,928 and 5,220,479 describe connecting an internal battery to the display so that the trip information is readable after the circuit interrupter operates to disconnect the protected circuit from the electrical distribution system.

When the circuits are intentionally disconnected for test purposes as well as to repair associated electrical equipment, the auxiliary power source, usually a battery, becomes drained in the process. Later when called upon to provide auxiliary power in an actual overcurrent condition, there is the possibility that the battery may not then have sufficient remaining charge to power-up the digital circuit components.

It would be beneficial to provide a system for controllably using the auxiliary power source solely when there is an actual overcurrent condition and to conserve battery power for such occurrence.

SUMMARY OF THE INVENTION

A battery switching circuit connected with a power supply to an electronic circuit interrupter is used to connect the battery to the circuit interrupter power supply solely by manual intervention. A switchable latching relay switch connecting between the battery operating, as the auxiliary power source, and the circuit interrupter power supply is only operated when the operator confirms that the protected circuit has experienced an overcurrent circuit interruption.

DESCRIPTION OF THE PREFERRED EMBODIMENT

Figure 1:
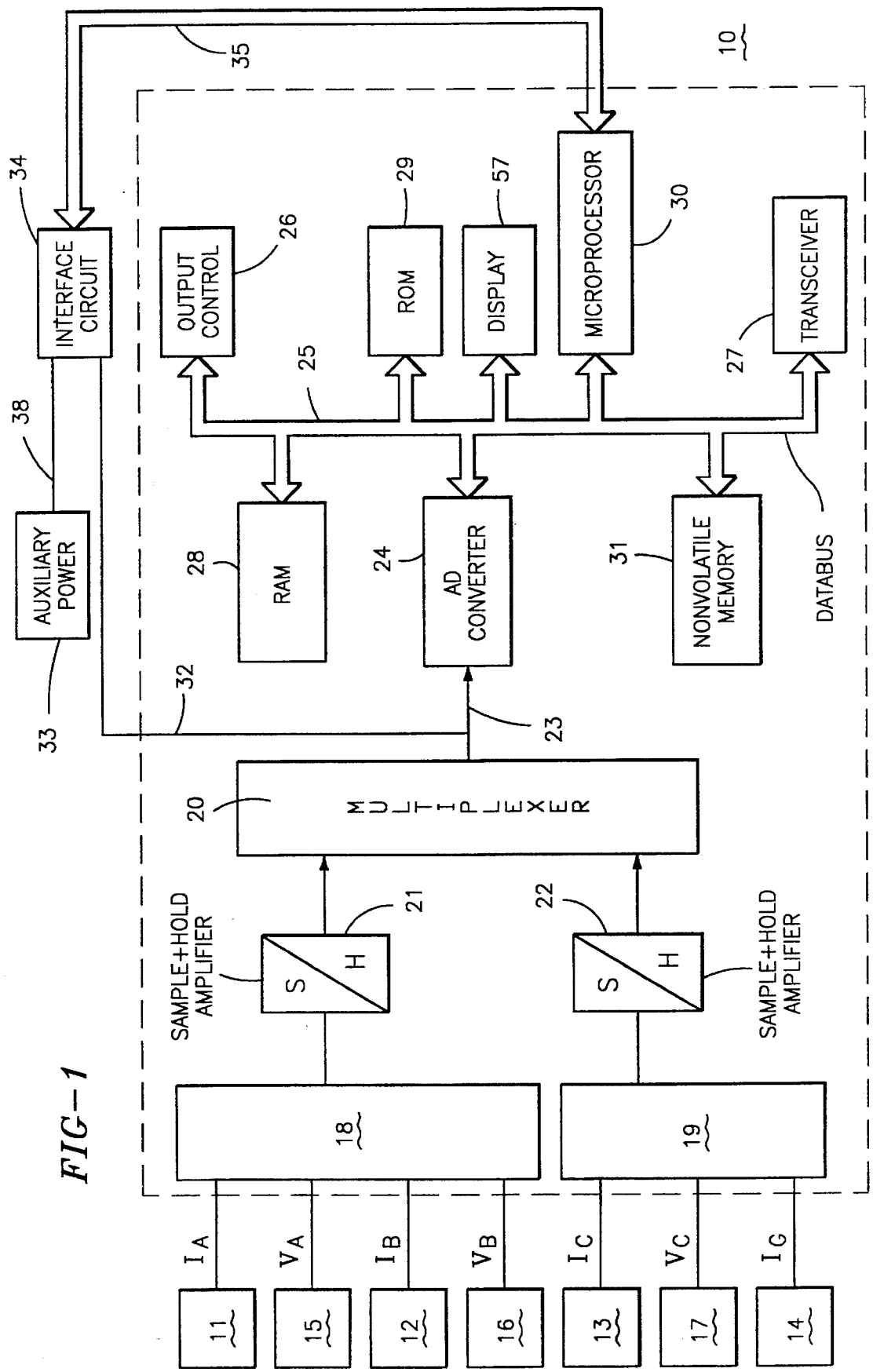
FIG. 1 is a schematic representation of a digital circuit interrupter employing the auxiliary power source and interface circuit according to the invention.
Figure 2:
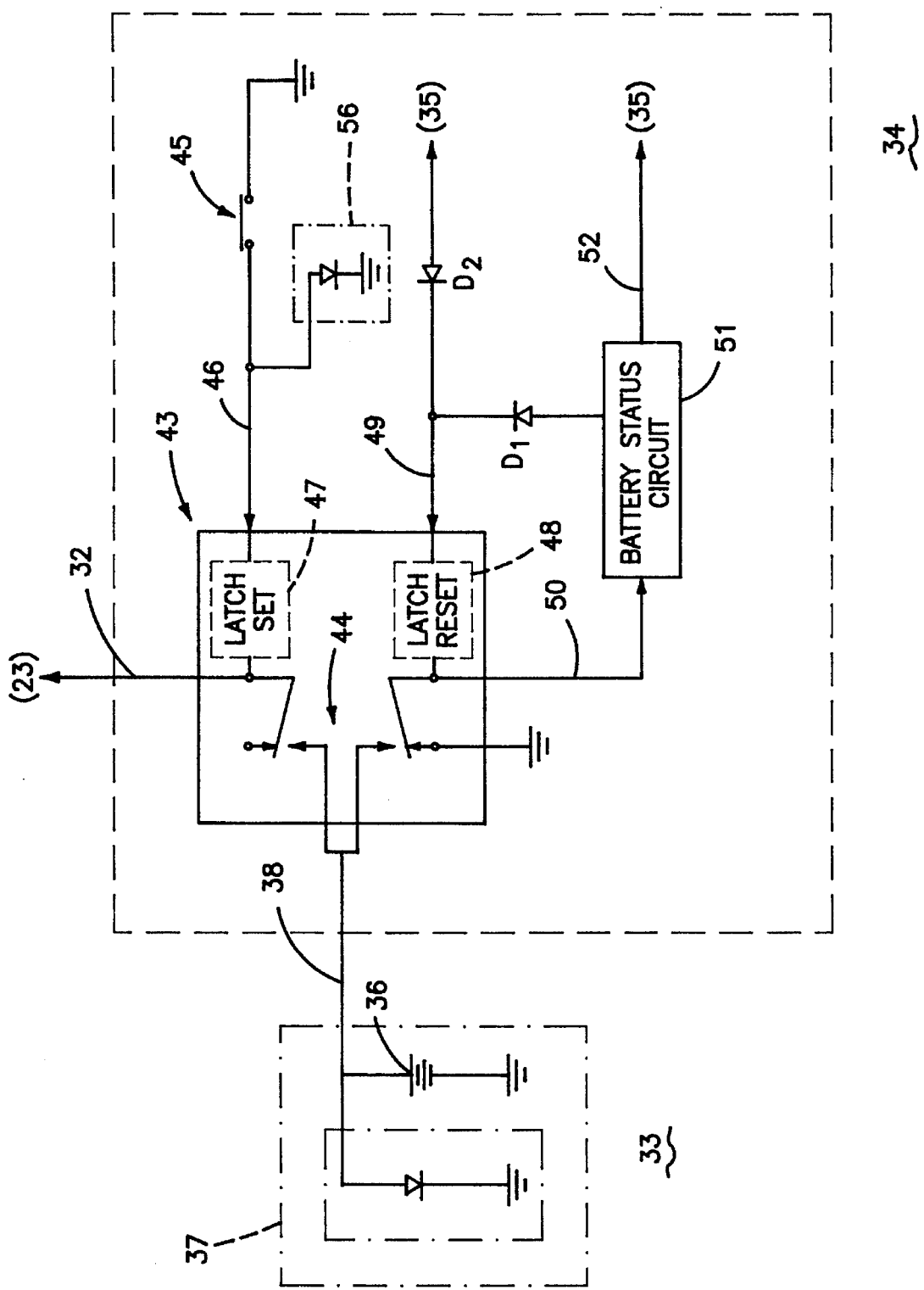
FIG. 2 is a detailed circuit diagram of the interface circuit within the circuit interrupter of FIG. 1.

As described within the aforementioned U.S. Pat. No. 4,672,501 a circuit breaker controller unit 9 such as depicted in FIG. 1 is contained on a printed circuit card 10 to which external connection is made with current transformers 11–14 and potential transformers 15–17. The electrical input is transmitted through multiplexers 18–20 and sample and hold amplifiers 21, 22 to an A/D converter 24 by means of conductor 23. As described within the aforementioned U.S. Patent, circuit protection and control is achieved by utilization of a data bus 25 which is interconnected with an output control 26, transceiver 27, and RAM 28. The ROM 29, microprocessor 30 and nonvolatile memory 31 operate in the manner described therein to insure complete overall circuit protection. The information as to the status of the circuit breaker contacts (not shown) that are controlled by the output control 26 is displayed on the display 57 that is similar to that described in U.S. Pat. No. 4,870,531 entitled "Circuit Breaker removable Display and Keyboard". Operating power to the printed circuit card 10 is supplied by the current transformers 11–14 from the associated electrical distribution system. To provide operational power to the unit when the associated electrical distribution system is disconnected from the current transformers, the auxiliary power source 33 is employed. The auxiliary power source electrically connects with the microprocessor 30 by means of the interface circuit 34, and by means of the control bus 35 to insure that the auxiliary power source is only connected by manual intervention. The interface circuit connects with the operating power supplied by the current transformers by means of conductor 32 and with the auxiliary power source by means of the conductor 38 and serves to prevent inadvertent discharge of the battery 36 which is best seen by now referring to the auxiliary power source and interface circuit 33, 34 depicted in FIG. 2.

A photocell 37 as indicated in phantom can be connected in parallel with or in place of the battery if desired. When the photocell is connected in parallel with the battery, it provides continuous charging current to the battery in the event the battery is not used for long periods of time. The battery connects with the latching relay 43 by means of the conductor 38 and the relay contacts 44. When the electrical power distribution circuit is interrupted, manual activation of the switch 45 operates the latch set coil 47 within the relay and closes the contacts 44. Power is now delivered to from the auxiliary power supply to the printed circuit board 9 of FIG. 1 over conductors 38 and 32. To disconnect the auxiliary power supply, the switch is again activated to operate the latch reset coil 48 and open the relay contacts 44. The relay can also be latched by means of the second photocell 56 which is indicated in phantom and which is responsive to an intense beam of light such as achieved by means of a flashlight. Both of the photocells 37, 56 can be located behind the display unit described earlier which presents optical access to external ambient light for charging the battery as well as access to the intense beam of light to operate the relay. The state of the latching relay 43 is indicated to the microprocessor 30 of FIG. 1 which connects with the relay by means of the control bus 35 diode D2 and conductor 49. Battery status information is indicated to the microprocessor by means of the battery status circuit 51 which connects with the latching relay 43 by means of conductor 50 and diode D1 and with the microprocessor by means of conductor 49, cable 52, diode D2 and the control bus 35.

Figure 3:
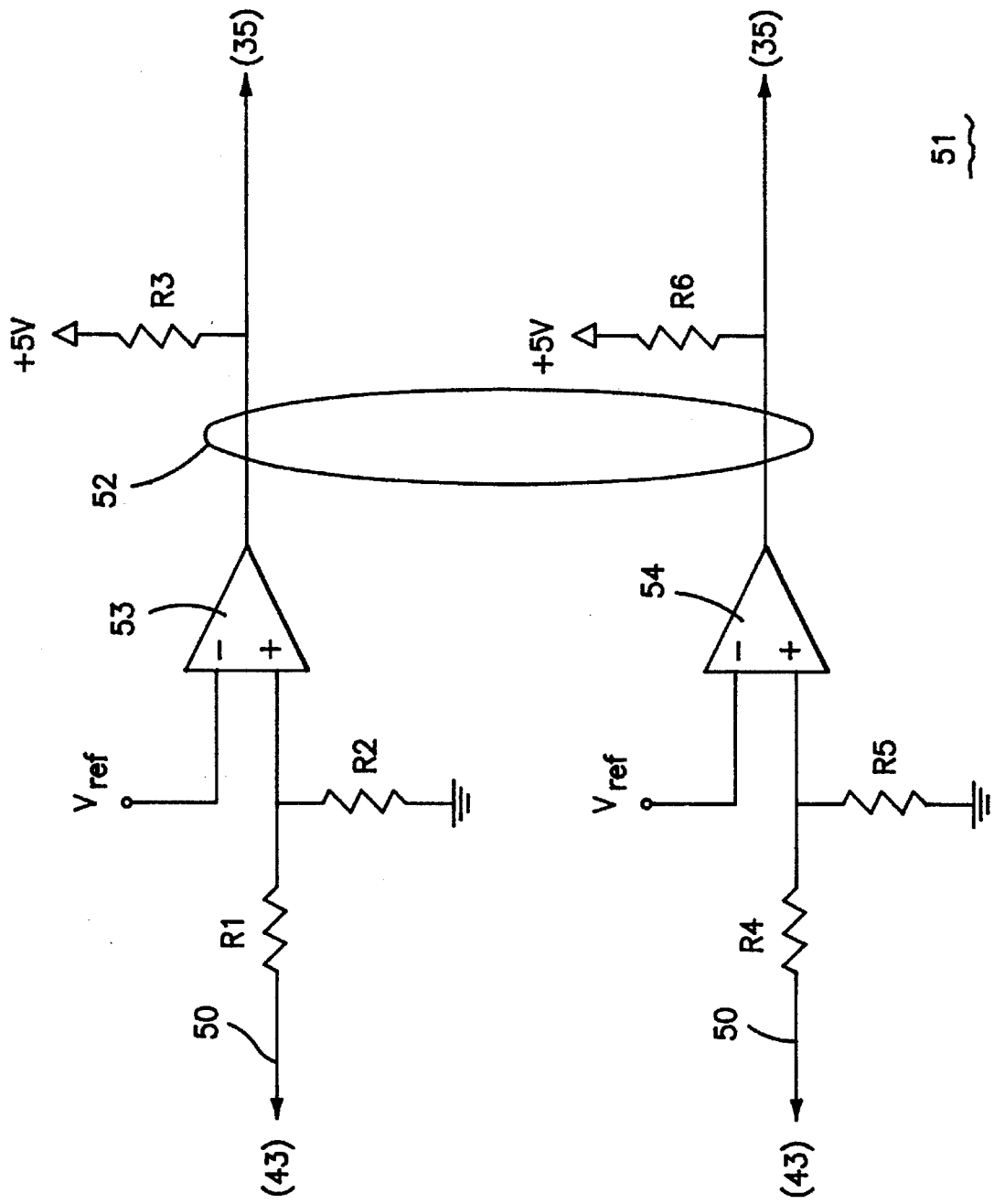
FIG. 3 is a detailed circuit diagram of the battery status circuit used with the interface circuit of FIG. 2.

The operation of the battery status circuit 51 is best seen by now referring to FIG. 3. A pair of comparators 53, 54 have one of their inputs connected with a reference voltage and the other of their inputs connected through voltage dividers R1, R2, R4, R5 respectively with the conductor connecting with the latching relay 43. The output of the first comparator 53 connects with the microprocessor 30 of FIG. 1 through one conductor within the dual conductor cable 52 for monitoring the voltage state of the battery 36 when the latching relay is latched and the battery is operational. The output of the second comparator 54 connects with the microprocessor through another conductor within the dual conductor cable 52 to indicate to the microprocessor when the latching relay is latched and the battery has become operational. Bias to the outputs of the comparators is supplied by means of the bias resistors R3 and R6, It has thus been shown that a circuit interrupter of the type employing a microprocessor and display to control the operational state of an electrical power distribution system can be made operational to power up the microprocessor and display by manual connection between the circuit interrupter and an auxiliary power source.

We claim:

1. An electronic trip unit for a circuit interrupter comprising:

transformer means arranged for connection with an electrical distribution system;

a processor circuit connecting with said transformer means receiving sample current signals from said distribution system to determine the occurrence of an overcurrent condition, said processor circuit further receiving operational power from said transformer means;

display means connecting with said processor circuit displaying magnitudes associated with an overcurrent condition;

auxiliary power means connecting with said processor circuit providing operational power to said processor circuit when said electrical distribution system is disconnected from said processor circuit; and an interface circuit connecting with said processor circuit and said auxillary power means for controlably connecting said auxiliary power means with said processor circuit after said electrical distribution circuit has become disconnected from said electrical distribution system, said auxiliary power means including a battery or a first photocell.

2. The electronic trip unit of claim 1 wherein said transformer means comprises a plurality of current transformers.

3. The electronic trip unit of claim 1 wherein said interface circuit includes a manual switch, said manual switch being open when said processor circuit is receiving operational power from said transformer means.

4. The electronic trip unit of claim 1 wherein said auxiliary power means includes a battery charger.

5. The electronic trip unit of claim 1 wherein said processor circuit includes a microprocessor.

6. The electronic trip unit of claim 5 wherein said processor circuit includes a relay connecting between said auxiliary power means and said processor circuit, said relay being controlled by operation of said manual switch.

7. The electric trip unit of claim 6 wherein said relay comprises a latching relay.

8. The electronic trip unit of claim 6 further including a second photocell arranged across said manual switch, said second photocell being connected with said relay whereby said relay becomes operated when said second photocell becomes optically activated.

9. The electronic trip unit of claim 7 wherein said second photocell is arranged within said display means.

10. The electronic trip unit of claim 6 wherein said interface circuit includes status means for providing indication of when said auxiliary power means is connected with said processor circuit.

11. The electronic trip unit of claim 10 wherein said status means comprises a pair of first and second comparators connecting between said relay and said processor circuit.

12. An electronic trip unit for a circuit interrupter comprising:

transformer means arranged for connection with an electrical distribution system;

a processor circuit connecting with said transformer means receiving sample current signals from said distribution system to determine the occurrence of an overcurrent condition, said processor circuit further receiving operational power from said transformer means;

display means connecting with said processor circuit displaying magnitudes associated with an overcurrent condition;

auxiliary power means connecting with said processor circuit providing operational power to said processor circuit when said electrical distribution system is disconnected from said processor circuit; and an interface circuit connecting with said processor circuit and said auxiliary power means for controlably connecting said auxiliary power means with said processor circuit after said electrical distribution circuit has become disconnected from said electrical distribution system, said auxiliary power means includes a batter or a first photocell, and said first photocell is arranged within said display means.

13. An electronic trip unit for a circuit interrupter comprising:

transformer means arranged for connection with an electrical distribution system;

a processor circuit connecting with said transformer means receiving sample current signals from said distribution system to determine the occurrence of an overcurrent condition, said processor circuit further receiving operational power from said transformer means;

display means connecting with said processor circuit displaying magnitudes associated with an overcurrent condition; and a photocell connecting with said processor circuit providing operational power to said processor circuit when said electrical distribution system is disconnected from said processor circuit.

14. The electronic trip unit of claim 13 wherein said photocell is arranged within said display means whereby said display means provides optical access to said photocell.

15. An electronic trip unit for a circuit interrupter comprising:

transformer means arranged for connection with an electrical distribution system;

a processor circuit connecting with said transformer means receiving sample current signals from said distribution system to determine the occurrence of an overcurrent condition, said processor circuit further receiving operational power from said transformer means;

display means connecting with said processor circuit displaying magnitudes associated with an overcurrent condition; and a photocell connecting with said display means providing operational power to said display means when said electrical distribution system is disconnected from said processor circuit.

16. The electronic trip unit of claim 15 wherein said photocell is arranged within said display means whereby said display means provides optical access to said photocell.

* * * * *